United States Patent
Zhang et al.

(10) Patent No.: US 9,802,848 B2
(45) Date of Patent: Oct. 31, 2017

(54) METHOD FOR TREATING WASTE SALINE WATER PRODUCED IN PRODUCTION PROCESS OF DIPHENYLMETHANE DIISOCYANATE (MDI)

(75) Inventors: Hongke Zhang, Zhejiang (CN); Weiqi Hua, Zhejiang (CN); Xiaogao Liu, Zhejiang (CN); Zhenhua Zhao, Zhejiang (CN); Shuchang Sun, Zhejiang (CN); Jiansheng Ding, Zhejiang (CN); Jianfeng Chen, Beijing (CN); Pengyuan Zhang, Beijing (CN); Haikui Zou, Beijing (CN); Guangwen Chu, Beijing (CN); Limin Xu, Beijing (CN)

(73) Assignee: WANHUA CHEMICAL (NINGBO) CO., LTD., Zhejiang (CN)

( * ) Notice: Subject to any disclaimer, the term of this patent is extended or adjusted under 35 U.S.C. 154(b) by 1103 days.

(21) Appl. No.: 13/496,872

(22) PCT Filed: Sep. 17, 2009

(86) PCT No.: PCT/CN2009/073991
§ 371 (c)(1),
(2), (4) Date: Mar. 16, 2012

(87) PCT Pub. No.: WO2011/032311
PCT Pub. Date: Mar. 24, 2011

(65) Prior Publication Data
US 2012/0168375 A1    Jul. 5, 2012

(51) Int. Cl.
*C02F 1/26* (2006.01)
*C02F 9/00* (2006.01)
*C01D 3/16* (2006.01)
*C01D 3/18* (2006.01)
*C02F 1/20* (2006.01)
*C02F 1/28* (2006.01)
*C02F 1/38* (2006.01)
*C02F 1/72* (2006.01)
*C02F 1/74* (2006.01)
*C02F 103/36* (2006.01)

(52) U.S. Cl.
CPC .......... *C02F 9/00* (2013.01); *C01D 3/16* (2013.01); *C01D 3/18* (2013.01); *C02F 1/20* (2013.01); *C02F 1/265* (2013.01); *C02F 1/283* (2013.01); *C02F 1/38* (2013.01); *C02F 1/72* (2013.01); *C02F 1/74* (2013.01); *C02F 2103/36* (2013.01)

(58) Field of Classification Search
None
See application file for complete search history.

(56) References Cited

U.S. PATENT DOCUMENTS

| | | | |
|---|---|---|---|
| 3,625,886 A | * | 12/1971 | Mattia .................... C02F 1/283 |
| | | | 203/92 |
| 4,762,931 A | | 8/1988 | Denecker et al. |
| 5,545,330 A | | 8/1996 | Ehrlich |
| 2005/0115901 A1 | | 6/2005 | Heuser |

FOREIGN PATENT DOCUMENTS

| | | | | |
|---|---|---|---|---|
| CN | 101020642 | | 8/2007 | |
| CN | 101020642 A | * | 8/2007 | ............ B01D 11/00 |
| CN | 101143753 | | 3/2008 | |
| CN | 101143753 A | * | 3/2008 | ............... C02F 9/04 |
| EP | 0224812 | | 6/1987 | |
| WO | WO-94/13606 | | 6/1994 | |
| WO | WO 2009/026208 A2 | | 2/2009 | |

OTHER PUBLICATIONS

Travis, Anthony S. "Toxicological and environmental aspects of anilines", The Chemistry of Anilines, Mar. 13, 2007, John Wiley & Sons, 835-870.*
International Search Report and Written Opinion mailed Jun. 24, 2010, in corresponding PCT application No. PCT/CN2009/073991 (English translation).
Supplementary European Search Report, EP 09 74 4307, issued Jan. 21, 2013.

* cited by examiner

*Primary Examiner* — Michael H Wilson
*Assistant Examiner* — Katherine Will
(74) *Attorney, Agent, or Firm* — Bryan D. Zerhusen; Locke Lord LLP

(57) ABSTRACT

The invention relates to a method of circular use of waste brine produced in the manufacture process of MDI, comprising the following steps: (1) the waste brine produced in the manufacture process of MDI is subjected to a high-gravity extraction and then to a column extraction, wherein said waste brine contains aniline, diaminodiphenylmethane and polyamine; (2) the waste brine from step (1) is transmitted to a stripping tower for steam stripping; (3) the waste brine from the stripping tower of step (2) and a chemical oxidant are transmitted to an oxidation reactor to which air is blown for aeration; (4) the waste brine after the treatment of step (3) is transmitted to an absorption tower for absorption. The invention makes the salt water have TOC of less than 8 ppm and TN of less than 2.5 ppm and achieves regeneration of resources in the waste brine such as sodium chloride and water and the like for circular use.

16 Claims, No Drawings

METHOD FOR TREATING WASTE SALINE WATER PRODUCED IN PRODUCTION PROCESS OF DIPHENYLMETHANE DIISOCYANATE (MDI)

CROSS-REFERENCE TO RELATED APPLICATIONS

This application is the U.S. national phase application pursuant to 35 U.S.C. §371 of PCT International Patent Application No. PCT/CN2009/073991, filed Sep. 17, 2009. The entire contents of the aforementioned patent application are incorporated herein by this reference.

FIELD OF THE INVENTION

This invention relates to a method of treatment of industrial waste brine, and more particular to a method of treatment of waste brine produced in the manufacture process of diphenylmethane diisocyanate (MDI).

BACKGROUND OF THE INVENTION

MDI is one of main chemicals in polyurethane industry. It is a well known process in polyurethane industry that a condensation reaction of aniline with formaldehyde in the presence of an aqueous acid catalyst (generally hydrochloric acid) is conducted to form polymethylene-polyphenyl-polyamine, and then a phosgenation reaction of polymethylene-polyphenyl-polyamine with phosgene is conducted to form MDI monomer and polymeric MDI.

One of the key steps in the preparation of MDI is that polymethylene-polyphenyl-polyamine hydrochloride obtained from the condensation reaction of aniline with formaldehyde in the presence of hydrochloric acid catalyst is neutralized with caustic soda, and then the polyamine layer is separated from the salt water layer, washed with process water and refined to form polyamine. The above neutralization and washing processes produce a great amount of waste brine, which contains organic compounds such as aniline, diaminodiphenylmethane, and polyamine. The waste brine has to be treated by extraction and steam stripping, and examined to ensure the pollutant content meets the requirements before it is discharged. The extractant used to treat the waste brine in the manufacture process of MDI is usually selected from toluene, xylene, chlorobenzene, dichlorobenzene or aniline and the like, and the extraction device is usually selected from a mixer-settler extraction column, an extraction column or a Graesser contactor and the like. The disadvantages of abovementioned extraction process are large device volume, big investment, low extraction efficiency, long extraction equilibrium time, easily blocking up of column plates or fillers by salt muds and so on, which result in that the level of organic amines in the discharged waste brine is relatively high and easily fluctuated.

Generally, the waste brine in the manufacture process of MDI, after treated by regular extraction and steam stripping, contains about 14%-18% NaCl, and its pH is usually in a range of about 12-14, TOC is about 30-50 ppm and TN is about 3-5 ppm. According to the requirements in the manufacture process of ion membrane caustic soda, the above-described waste brine only meets the discharge limits rather than being used directly as a feedstock due to its high level of organic amines. Considering the great amount of waste brine discharged in the manufacture process of MDI, it is a considerable waste of water resource and salts. From the view of sustainable development and circular economy, it highly desirable that the great amount of waste brine is deeply treated to make the organic content meet the requirements of the manufacture process of ion membrane caustic soda, and then it can be used as a feedstock of ion membrane caustic soda plant to produce chlorine, caustic soda, hydrochloric acid and hydrogen and the like which are basic materials in the manufacture of MDI. It would achieve the circular use of materials in MDI industry chain by recovering resources such as sodium chloride and water from the waster salt water in the manufacture of MDI.

Chinese Patent ZL200710013817.2 describes a continuous process of extracting polymethylene polyphenyl polyamine from its salt water solution. The disadvantage of the method is that the waste brine contains a relatively high level of organic compounds (high TOC and TN values) without following deep treatments and only applies strictly to a diaphragm electrolysis in the manufacture of caustic soda from the view of safety. In a long term view, the diaphragm electrolysis process is restricted by policies due to its high energy consumption, and it would be replaced by ion membrane electrolysis which has stricter requirements on the organic content of the salt water.

Chinese Patent ZL200710138065.2 describes a method of deep treatment of waste brine in MDI manufacture process. The disadvantages of the method are that the stripping tower consumes too much steam and energy because only one regular extraction treatment is conducted, and the deep treatment consumes a considerable amount of oxidants and absorbents due to the high level of organic content in the waster salt water prior to the deep treatment, which causes a high cost.

BRIEF DESCRIPTION OF THE INVENTION

In order to overcome abovementioned disadvantages, the object of the invention is to provide a method for treatment of the waste brine in the manufacture process of MDI.

The method provided by the invention for treatment of the waste brine in the manufacture process of MDI, comprises the following steps:

(1) The waste brine in the manufacture process of MDI and a fresh extractant are transmitted to a high-gravity rotating bed for fast mixing, wherein said waste brine contains aniline, diaminodiphenylmethane, and polyamine, and then a phase separation of the extractant and the waste brine is conducted in a phase separator; and then the phase-separated waste brine and a fresh extractant are transmitted to an extraction column for countercurrent extraction;

(2) The waste brine out of the extraction column of step (1) is transmitted to a stripping tower for steam stripping;

(3) The waste brine out of the stripping tower of step (2) and a chemical oxidant are transmitted to a oxidation reactor to which air is also blown for aeration;

(4) The waste brine after the treatment of step (3) is transmitted to an absorption tower for absorption, and then qualified salt water is obtained.

Wherein, the salt water after the treatment of step (4) may be transmitted directly as a feedstock to a chloro-alkali plant.

In the method of the invention, normally, in the waste brine produced in the polyamine production step of MDI manufacture process, the weight concentration of aniline is 1-3%, the total weight concentration of diaminodiphenylmethane (DAM) and polyamine is 0.05%-0.3%, and the weight concentration of sodium chloride in the salt water is 14-18%.

In the method of the invention, the waste brine and an extractant are first added into a high-gravity rotating bed for extraction. The waste brine and the extractant may be transmitted to the high-gravity rotating bed separately via a liquid distributor at inlets of the high-gravity rotating bed, or alternatively both are pre-mixed together and then transmitted to the high-gravity rotating bed via a liquid distributor. The waste brine and the extractant may be transmitted into the high-gravity rotating bed in a co-current or cross current manner, and the liquid distributor may be in a type of hole, slot, single hole, multi-hole, single slot, or multi-slot, and in a form of single unit or multi-unit.

In the method of the invention, said phase separator refers to a device wherein a polyamine layer and a salt water layer are separated for density difference, which may be a static device, e.g. a clarifier tank or an oil-water separator. The separator usually comprises a lateral separation part and a vertical separation part, wherein the lateral separation part is equipped with several slant barriers which benefits the separation of the two phases, and the vertical separation part is a static one or a dynamic one, e.g. a centrifugal separator.

In the method of the invention, the micro mixing effect nearly reaches a molecule level, and the oil phase (the extractant) and the water phase (the waste brine) reach an extraction equilibrium in a very short time, about 0.1-10 seconds, because the high-gravity rotating bed can mix the waste brine and the extractant fast and evenly. In a regular extraction, the equilibrium time is relatively long, usually in a level of hours; before the equilibrium is reached, the treatment effect is not steady, the organic content of the waste brine is relatively high, and the waste brine is not qualified for discharge which affects the regular manufacture process.

The extraction of the waste brine by using a high-gravity rotating bed reduces the use amount of an extractant and gets higher and steadier treatment efficiency than regular extractions. The volume flow rate ratio of the fresh extractant to the waste brine transmitted into the high-gravity rotating bed is 1:5-1:20, preferably 1:10-1:15; and the residence time of the fresh extractant and the waste brine in the phase separator is 10-120 minutes, preferably 20-40 minutes.

In the method of the invention, the extractant of step 1 may be selected from various regular extractants in the art. The extractant of the invention includes but is not limited to aniline, p-toluidine, o-toluidine, p-ethylaniline, o-ethylaniline, 2,4-dimethyl aniline or 2,4,6-trimethyl aniline, or a mixture of any of the foregoing materials; the extractant of the invention is preferred to be aniline. After DAM is extracted by fresh aniline (i.e. industry grade aniline) from the waste brine, it can be used as a feedstock of polyamine manufacture without any further refine treatment.

In the method of the invention, the waste brine extracted in the high-gravity rotating bed is phase separated in the phase separator, and then the waste brine after the phase separation and a fresh extractant are transmitted into an extraction column in a count-current manner. The objection of the extraction column treatment is to achieve a better treatment effect, improve the extraction efficiency and reduce operation cost. Since the transfer rate of the extraction process in the high-gravity rotating bed is significantly high, about 50-80% of organic compounds are extracted from the waste brine. The following extraction column (long equilibrium time, low transfer rate, and relatively higher fillers or more plates are usually needed) may be in operation with a relatively heavier load than usual to improve the operation efficiency. Meanwhile, the extraction performance is better since there are tens of equilibrium stages in the extraction column, which results in a lower organic content in the waste brine. The pre-treatment of extraction by the high-gravity rotating bed prevents the extraction column from blocking up of fillers or plates by salt muds and limit exceeding of wastewater which usually happen after a long term operation.

The extraction column may be a plate column or a filler column. The type of inner parts of the column such as liquid distributor, filler or plate may be selected from regular industrial models according to engineering needs. There is no particular requirement for the inner structure of the column. The volume flow rate ratio of the fresh extractant to the waste brine is 1:2-1:12, preferably 1:5-1:10.

In the method of the invention, said high-gravity rotating bed (called Higee or RPB) is a novel device which can strengthen greatly the transfer and micromixing processes. Its basic theory is to accelerate the intermolecular transfer rate between liquid and liquid by using of the analogue and controllable high gravity environment produced by rotating. The extraction of the waste brine is strengthened by a high-gravity rotating bed as the first step of the extraction treatment, and the extraction column as the second extraction step can improve the extraction efficiency, avoid blocking up of inner parts of the device and easy fluctuation of the organic content, reduce the height of fillers, the number of plates, reflux ratio, volume and the like of the column and save operation cost and investment cost.

The waste brine after said two step extractions is transmitted to a stripping tower, and the stripping tower may be a plate column or a filler column. The type of liquid distributor, filler or plate may be selected from regular industrial models according to engineering needs. There is no particular requirement for the inner structure of the tower. The amount of steam used in the stripping tower may be determined by the skilled in the art according to specific technical conditions.

In the method of the invention, the stripping tower may be a plate column or a filler column, the steam-water ratio (the mass flow rate ratio of steam to the waste brine) is controlled at 1:2-1:10, preferably 1:4-1:8, more preferably 1:5-1:7, and the steam pressure is preferred to be 1.9-2.0 $kg/cm^2$.

In the method of the invention, generally, the total amount of aniline, diaminodiphenylmethane and polyamine in the waste brine after the two step extractions and the steam stripping is not more than 3 ppm (HPLC). When their total amount is more than 3 ppm, it's preferred to transmit the waste brine back to the MDI manufacture devices for extraction and stripping until the total amount of aniline, diaminodiphenylmethane and polyamine is less than 3 ppm, and then the waste brine is transmitted to said oxidation reactor of the invention for treatment.

Generally, the oxidation effect on organic compounds in the waste brine can be improved to accelerate their decomposition by increasing the temperature of oxidation reaction and/or aeration intensity. The deeper oxidation brings more complete decomposition. Due to the corrosiveness of the waste brine, a relatively high reaction temperature sets a stricter requirement for the material of the equipments. Therefore, it needs more expensive corrosion resistant material to make and heat exchanging devices which is also made of expensive materials. Meanwhile, due to relatively strong aeration intensity, a draught fan with a higher blast volume and an oxidation reactor with a bigger volume are needed. Therefore, the investment cost for the oxidation reactor is very high.

In the method of the invention, the reaction temperature of the waste brine from the stripping tower in the oxidation reactor is controlled at 20-90° C., preferably 25-55° C.; the reaction time is controlled between 20-150 minutes, preferably 40-90 minutes; the blast volume of air is controlled according to the volume flow rate ratio of air to the waste brine between 10-60:1, preferably 15-30:1. The reaction conditions in the oxidation reactor of the invention are relatively mild, which reduces significantly investment cost and operation cost.

In the method of the invention, the chemical oxidant is selected from hydrogen peroxide, ozone or an oxidant containing free chlorine. The oxidant containing free chlorine may be liquid chlorine, chlorine, sodium hypochlorite, chlorine dioxide or light salt water containing free chlorine from an ion-exchange membrane electrolyzer of a chloro-alkali plant. The oxidant used in the invention may be common industry products, or by-products recycled from industry processes. The addition amount of said chemical oxidant may be determined by the skilled in the art according to the type of the chemical oxidant used and specific process conditions. Said oxidant is preferred to be an oxidant containing free chlorine, more preferably light salt water containing free chlorine from an ion-exchange membrane electrolyzer of a chloro-alkali plant; the addition amount of light salt water containing free chlorine is controlled according to a standard of 50-5000 mg free chlorine added per liter of the waste brine, preferably 100-4000 mg free chlorine added per liter of the waste brine.

In the method of the invention, the absorption process of the waste brine may be conducted in any absorption tower suitable for the process of the invention, wherein an activated carbon absorption tower is preferred. The invention does not have particular requirements to the arrangement of the absorption tower, rather than it meets the requirements of the process. The absorption tower may be one or more; when more than one absorption towers are used, they may be arranged in parallel or in series. It is preferred to use two fixed bed activated carbon absorption towers in series. The activated carbon in said activated carbon absorption tower is preferred to be coal based cylindrical activated carbon or granular activated carbon, whose dimensional size may be engineered by the skilled in the art according to the requirement of pressure drop of the absorption tower. The grain diameter of regular coal based cylindrical activated carbon is 1.5-5 mm. When the absorption of the activated carbon is saturated, it's preferred to send the activated carbon back to the manufacturer for regeneration, in order to avoid secondary pollution. Generally, the activated carbon may be reused for 2-3 times. Non-regenerable activated carbon may be used for thermal power generation. For example, it may be used as the fuel of a thermal power unit combustion furnace, which has a furnace temperature up to about 1300-1400° C. to combust organic compounds completely and recycle the power.

In the absorption process of the invention, the absorption temperature is controlled between 25-50° C., preferably 30-50° C.; the average residence time of the waste brine in the absorption tower is controlled between 3-20 minutes, preferably 5-10 minutes.

In the method of the invention, the waste brine after the absorption treatment may be used in the manufacture process of ion membrane caustic soda as a feedstock of the ion membrane caustic soda to prepare feedstocks of MDI manufacture.

The salt water after the absorption treatment is usually collected in a product salt water tank, whose TOC (Total Organic Carbon) is less than 8 ppm and TN (Total Nitrogen) is less than 2.5 ppm, and then transmitted to manufacture devices of ion membrane caustic soda. In such devices, after going through salt dissolving and refining sections, it may be used as a feedstock of caustic soda manufacture to produce caustic soda, chlorine and hydrogen as feedstocks of MDI manufacture by electrolysis.

Comparing with prior art, benefits of the invention mainly show as follows:

1. The invention can remove amine organic compounds from the MDI waste water more completely. The salt water after the treatment has TOC of less than 8 ppm and TN of less than 2.5 ppm. In the circular use of obtained salt water of the invention, the life time of membrane in the ion-exchange membrane electrolyzer is further extended because organic contents are reduced (low TOC and TN value); the polluted level of the ion-exchange membrane, the voltage of the electrolyzer and power consumption are also reduced. Meanwhile, due to the low TN value, the risk of using MDI waste brine in the ion-exchange membrane electrolyzer is further reduced.
2. The salt water after the treatments of the invention may be used as a feedstock of ion membrane electrolysis in a chloro-alkali plant, to produce chlorine, caustic soda, hydrochloric acid and hydrogen and the like, which are feedstocks of a MDI plant. The resources such as sodium chloride and water in the MDI waster salt water are also regenerated, which achieves the circular use in the MDI industry chain and solves the environment pollution of the waste brine.
3. The invention uses two step extraction treatments, a high-gravity rotating bed extraction as the first step and an extraction column as the second step, to improve the extraction efficiency and avoid blocking up of inner units of devices and easy fluctuation of organic contents. Meanwhile, the height of filler or the number of plates of the column, reflux ratio and device volume are reduced, as well as operation cost and investment cost.
4. The invention uses non-dechlorination light salt water from an ion-exchange membrane electrolyzer as an oxidant. On one side, it makes use of chlorine in the light salt water and alkaline in the waste brine. On the other side, it makes use of free chlorine in the light salt water to reduce the load of a dechlorination tower, the following addition amount of sodium sulfite, and operation cost of chloride absorption by alkaline solutions.
5. The process procedure of the invention exhibits advantages such as simple procedure, convenient operation, reliable operation and low scale-up investment cost and the like.

DETAILED DESCRIPTION OF THE INVENTION AND EMBODIMENTS

The method of the invention will be illustrated by, but not limited to, the following examples.

Example 1

The waste brine is taken from the condensation section of MDI plant and a waste brine tank, and the flow rate is controlled at 1000 L/h, wherein the content of aniline is 1.5% and the content of DAM is 1200 ppm. The said waste brine and fresh aniline from a aniline tank with a flow rate of 100 L/h are added respectively to a first high-gravity rotating bed via two liquid inlets (produced by Research Center of the Ministry of Education for High-Gravity Engineering and Technology at Beijing University of Chemical Technology, the diameter of the rotor is about 300 mm, thickness of the metal filling layer is about 15 mm, and power is about 5 KW) and the rotation rate of the high-gravity rotating bed is controlled at 1000 rpm. The waste brine and extractant flows to the outer edge from the interior edge of the high-gravity rotating bed under the centrifugal force and flows to a phase separator (produced by Yantai Muchun Machinery, the volume is 3 cubic meters) via a liquid outlet. The residence time of the waste brine in the separator is controlled at 40 minutes by an interface regulator, and the solution is phase separated with an extractant (aniline) phase at the top and a salt water layer at the bottom. The extractant is continuously transmitted out to a recycle aniline tank from the top, and the salt water is poured out from the bottom to the first waste brine accumulator tank (the volume is about 10 cubic meters). The DAM content of the waste brine drops to 18 ppm by analysis after the extraction in the high-gravity rotating bed.

The waste brine at a rate of 1000 L/h from the first waste brine accumulator tank and fresh aniline at a rate of 180 L/h from an aniline stock tank are transmitted into an extraction column via an upper inlet and a lower inlet thereof respectively. Due to the density difference, a counter current extraction between the waste brine and aniline is conducted. The extraction column has a diameter of 500 mm, and is filled with pall ring filler to 2500 mm height. The DAM content of the waste brine drops to 0.8 ppm and the concentration of aniline is about 2.6% by analysis after the second step of column extraction. The treated waste brine is collected in a secondary waste brine accumulator tank.

The waste brine is transmitted to the top of a stripping tower at a rate of 3000 L/h from the secondary waste brine accumulator tank, and steam from the bottom of the tower transfers mass and heat with the salt water down from the top of the tower to remove aniline with a steam flow rate of 500 Kg/h and steam pressure of 1.9 Kg/cm$^2$. The stripping tower is operated at atmospheric pressure and only has a stripping section. The top of the stripping tower has 8 SVG antiblocking plates (Sulzer Ltd.) and below that is a filler layer of 3 meter with Sulzer 452 Y filler. The waste brine after stripping is transmitted to a MDI waste brine tank (about 20 cubic meters). By analysis, the waste brine contains aniline of about 1.7 ppm, DAM of about 0.7 ppm, TOC value of about 16 ppm, and TN of about 3.2 ppm. The sodium chloride in the waste brine is about 18% and pH is about 13.

Example 2

The waste brine in the MDI waste brine tank of Example 1 2000 ml is taken out to a 2 L glass lined vessel with an insert aeration tube. 30% concentration hydrogen peroxide (analysis grade, Yantai Chemical Engineering Institution) 12 ml is added and a chemistry oxidation reaction is conducted at room temperature with air blowing-in. The aeration intensity is 40 L air/hour. After 1 hour, the waste brine is transmitted at a rate of 540 ml/h to a glass absorption column with a jacket (diameter is 30 mm and height is 800 mm). The column is filled with cylindrical coal based activated carbon of 4 mm diameter 100 g, and the temperature of the waste brine is 30-40° C., and the residence time of the waste brine in the glass absorption column is 12 minutes. The salt water after going through the column is collected and analyzed. The treated salt water does not have detectable aniline and diamine, TOC is about 6.9 ppm, TN is about 1.4 ppm, and organic content meets the requirements of ion membrane caustic soda.

Example 3

The MDI waste brine after the treatments of Example 1 is tested.

The waste brine in the MDI waste brine tank 1200 ml is transmitted to a 2 L glass lined vessel with an insert aeration tube. 10% concentration sodium hypochlorite (reagent grade, Yantai Sanhe Chemical Reagent Ltd.) 6 ml is added and a chemistry oxidation reaction is conducted at 40° C. with air blowing-in. The aeration intensity is 40 L air/hour. After 1 hour, the waste brine is transmitted by a flow control pump at a rate of 540 ml/h to a glass absorption column with a jacket. The column is the same as the one used in Example 1, and the temperature of the waste brine is 30-40° C., and the residence time of the waste brine in the glass absorption column is about 12 minutes. The treated salt water does not have detectable aniline and diamine, TOC is about 6.8 ppm, TN is about 1.5 ppm, and organic content meets the requirements of ion membrane caustic soda.

Example 4

The MDI waste brine after the treatments of Example 1 is tested.

The waste brine in the MDI waste brine tank 1200 ml is transmitted to a 2 L glass lined vessel with an insert aeration tube. Ozone is blown in at a rate of 10 g/h, and ozone is produced by an ozone producer (KT-OZ-10G Type). After 1 hour, the waste brine is transmitted by a flow control pump at a rate of 540 ml/h to a glass absorption column with a jacket. The column is the same as the one used in Example 1, and the temperature of the waste brine is 30-40° C., and the residence time of the waste brine in the glass absorption column is about 12 minutes. The treated salt water does not have detectable aniline and diamine, TOC is about 7.5 ppm, TN is about 1.6 ppm, and organic content meets the requirements of ion membrane caustic soda.

Example 5

The MDI waste brine after the treatments of Example 1 is tested.

The non-dechlorination light salt water from the manufacture device of an ion membrane caustic soda is cooled down and analyzed. The content of free chorine (hypochlorite) is about 1500 ppm, TOC is about 5 ppm, and TN is about 2.5 ppm. The non-dechlorination light salt water is used as a chemical oxidant.

The waste brine in the MDI waste brine tank 1200 ml is transmitted to a 2 L glass lined vessel with an insert aeration tube. The non-dechlorination light salt water 600 ml is added and a chemistry oxidation reaction is conducted at room temperature with air blowing-in. The aeration intensity is 60 L air/hour. After 1 hour, the waste brine is transmitted by a flow control pump at a rate of 540 ml/h to a glass absorption column with a jacket. The column is the same as the one used in Example 1, and the temperature of the waste brine is 30-40° C., and the residence time of the waste brine in the glass absorption column is about 12 minutes. The treated salt water does not have detectable aniline and diamine, TOC is about 6.5 ppm, TN is about 1.4 ppm, and organic content meets the requirements of ion membrane caustic soda.

Example 6

The MDI waste brine after the treatments of Example 1 is tested.

The waste brine in the MDI waste brine tank 1200 ml is transmitted to a 2 L glass lined vessel with an insert aeration tube. The non-dechlorination light salt water 600 ml is added and a chemistry oxidation reaction is conducted at 40-50° C. with air blowing-in. The aeration intensity is 60 L air/hour. After 1 hour, the waste brine is transmitted by a flow control pump at a rate of 540 ml/h to a glass absorption column with a jacket. The column is the same as the one used in Example 1, and the temperature of the waste brine is 30-40° C., and the residence time of the waste brine in the glass absorption column is about 12 minutes. The salt water after the treatment does not have detectable aniline and diamine, TOC is about 6.2 ppm, TN is about 1.2 ppm, and organic content meets the requirements of ion membrane caustic soda.

Example 7

The MDI waste brine is taken from the MDI waste brine tank of Example 1 and samples have been taken for analysis. The non-dechlorination light salt water from the manufacture device of ion membrane caustic soda is stored in a light salt water tank of 10 cubic meters, cooled down and samples are taken for analysis: the content of free chorine (hypochlorite) is about 1500 ppm, TOC is about 5 ppm, and TN is about 2.5 ppm.

The MDI waste brine is transmitted at a flow rate of 300 kg/h from the waste brine tank to a liquid inlet at the bottom of a bubble column (500×3300 mm), meanwhile, the non-dechlorination light salt water is transmitted to the inlet at a flow rate of 150 kg/h. Air is continuously blown to a gas inlet at the bottom of the column, and the aeration intensity is 13 cubic meters/h. The waster salt water flows out from the outlet at the top of the bubble column, flows into an activated carbon absorption tower via a liquid inlet at the bottom of the tower (600×3550 mm, filled with coal based cylindrical activated carbon of 4 mm diameter 400 kg), flows through the activated carbon bed, flows out of the top of the absorption tower and flows into a product salt water tank of 20 cubic meters. The treated salt water in the product salt water tank is analyzed: there is no detectable aniline and diamine, TOC is about 6.2 ppm, TN is about 1.2 ppm, and organic content meets the requirements of ion membrane caustic soda.

The test equipments in above MDI waste brine process are continuously operated for 120 hours, and about 54 tons treated salt water is obtained, whose analysis parameters all meet the requirements of ion membrane caustic soda. After it is delivered to a salt water process system of ion membrane manufacture devices, all process parameters of the manufacture devices are normal.

We claim:

1. A method for treatment of waste brine produced in the manufacture of diphenylmethane diisocyanate (MDI), comprising the following steps:
    (1) transmitting waste brine produced in a MDI manufacture device and a fresh extractant to a high-gravity rotating bed for fast mixing, wherein said waste brine contains aniline, diaminodiphenylmethane and polyamine, and then separating the extractant and the waste brine in a phase separator; and then transmitting the phase-separated waste brine and a fresh extractant to an extraction column separate from the MDI device for countercurrent extraction;
    (2) transmitting the waste brine out of the extraction column of step (1) to a stripping tower separate from the MDI device for steam stripping;
    (3) transmitting the waste brine out of the stripping tower of step (2) and a chemical oxidant to an oxidation reactor to which air is blown for aeration; and
    (4) transmitting the waste brine after the treatment of step (3) to an absorption tower for absorption, and then obtaining qualified salt water.

2. The method according to claim 1, wherein said waste brine is from salt water in the production of polyamine in the MDI manufacture process, the weight concentration of aniline in the salt water is 1-3%, the total weight concentration of diaminodiphenylmethane and polyamine is 0.05%43%, and the weight concentration of sodium chloride in the salt water is 14-18%.

3. The method according to claim 2, wherein the volume flow ratio of the fresh extractant to the waste brine transmitted into the high-gravity rotating bed in step (1) is 1:5-1:20, and the residence time of the fresh extractant and the waste brine in the phase separator is 10-120 minutes.

4. The method according to claim 3, wherein the volume flow ratio of the fresh extractant to the phase-separated waste brine transmitted into the extraction column in step (1) is 1:2-1:12, and wherein the extraction column is a plate column or a filler column.

5. The method according to claim 4, wherein the extractant in step (1) is aniline, p-toluidine, o-toluidine, p-ethylaniline, o-ethylaniline, 2,4-dimethyl aniline or 2,4,6-trimethyl aniline, or a mixture of any of the foregoing materials.

6. The method according to claim 5, wherein the stripping tower in step (2) is a plate column or a filler column, and the mass flow rate ratio of steam to the waste brine is 1:2-1:10, and the steam pressure is 1.9-2.0 kg/cm$^2$; wherein, the content of aniline, diaminodiphenylmethane and polyamine in the waste brine out of the stripping tower is less than 3 ppm; and wherein the TOC value of the waste brine is less than 20 ppm.

7. The method according to claim 6, wherein step (3) further comprises the reaction temperature of the oxidation reactor is controlled at 20-90° C., and the reaction time is controlled between 20-150 minutes, and the blast volume of air is controlled according to the volume flow ratio of air to the waste brine between 10-60:1, and wherein the oxidation reactor is a bubble tower reactor or a vessel/tank with an aeration device or a tank reactor.

8. The method according to claim 7, wherein the chemical oxidant in step (3) is selected from hydrogen peroxide, ozone, chlorine, liquid chlorine, sodium hypochlorite, chlorine dioxide or light salt water containing free chlorine from the ion-exchange membrane electrolyzer of a chloro-alkali plant.

9. The method according to claim 8, wherein, in step (4): the absorption temperature of the absorption tower is controlled between 25-50° C.; and the average residence time of the waste brine in the absorption tower is controlled between 3-20 minutes.

10. The method according to claim 9, wherein the absorption tower in step (4) is one or more fixed bed activated carbon absorption towers in series, and the activated carbon is coal based cylindrical activated carbon or granular activated carbon.

11. The method according to claim 10, wherein the obtained salt water in step (4) has TOC of less than 8 ppm and TN of less than 2.5 ppm.

12. The method according to claim 3, wherein the volume flow ratio of the fresh extractant to the waste brine transmitted into the high-gravity rotating bed in step (1) is 1:10-1:15 and the residence time of the fresh extractant and the waste brine in the phase separator is 20-40 minutes.

13. The method according to claim 4, wherein the volume flow ratio of the fresh extractant to the phase-separated waste brine transmitted into the extraction column in step (1) is 1:5-1:10.

14. The method according to claim 6, wherein, in step (2), the mass flow rate ratio of steam to the waste brine is 1:4-1:8.

15. The method according to claim 7, wherein step (3) further comprises the reaction temperature of the oxidation reactor is controlled at 25-55° C., and the reaction time is controlled between 40-90 minutes, and the blast volume of air is controlled according to the volume flow ratio of air to the waste brine between 15-30:1.

16. The method according to claim 9, wherein, in step (4): the absorption temperature of the absorption tower is controlled between 30-50° C.; and the average residence time of the waste brine in the absorption tower is controlled between 5-10 minutes.

* * * * *

UNITED STATES PATENT AND TRADEMARK OFFICE
CERTIFICATE OF CORRECTION

PATENT NO. : 9,802,848 B2  
APPLICATION NO. : 13/496872  
DATED : October 31, 2017  
INVENTOR(S) : Hongke Zhang et al.

Page 1 of 1

It is certified that error appears in the above-identified patent and that said Letters Patent is hereby corrected as shown below:

On the Title Page

Item (73), Assignee should include "BEIJING UNIVERSITY OF CHEMICAL TECHNOLOGY, Beijing, (CN)"

Signed and Sealed this  
Twenty-third Day of April, 2019

Andrei Iancu  
*Director of the United States Patent and Trademark Office*